Patented July 29, 1941

2,251,256

UNITED STATES PATENT OFFICE 2,251,256

PURIFYING OF EARTHY MINERALS

William Feldenheimer, London, England

No Drawing. Application August 28, 1936,
Serial No. 98,338

12 Claims. (Cl. 252—1)

My invention relates to processes of treating earthy materials such as clays, in order to improve their color, brightness and purity.

It has been proposed to bleach clays by the use of hydrosulphurous acid compounds and to then neutralize the acidity of the clay slip by washing with water and/or adding alkali. Such addition of alkali sufficient to neutralize the acidity as heretofore practiced, did not improve the color, brightness or purity of the clay but, on the contrary, it was found that the color deteriorated somewhat upon drying. It has also been proposed to neutralize the acidity of such clay slip by washing out and removing the bleaching agents by decantation, and then adding alkali to thin the clay slip.

It has also been common to deflocculate the clay prior to such treatments for purifying and improving the color. In long experimentation on this subject, I have discovered that while, after bleaching with hydrosulphurous acid compounds and neutralizing the acidity, the ordinary addition of alkali did not improve the color, but usually had the reverse effect; nevertheless, if the alkali content was increased sufficiently the clay slip would thicken instead of becoming thinner, and a great improvement will occur in the color, brightness and purity.

I have also found that when using as a bleaching agent, zinc digested in sulphurous acid, the concentration of alkali required to thicken the slip and produce the improved color, etc. in the clay, corresponds to an alkali concentration which will precipitate or throw down zinc hydroxide in the clay slip.

There is a further advantage in producing a thicker clay slip, this being that the slip may be more economically de-watered and dried than in the case of a thin clay slip.

I will now describe some examples of my process.

Example No. 1

20 grs. of Georgia clay were shaken in a test tube with 80 c. c. of water. A solution of hydrosulphurous acid compound was made by digesting excess zinc foil in $H_2SO_3$. The sulphurous acid contained 4% by weight of $SO_2$. Of this latter solution, a quantity equivalent to 2% by weight of the $SO_2$ relative to the clay was immediately added. The solution was then allowed to stand for thirty (30) minutes to cause a bleaching of the clay.

Then, without decanting of any of the supernatant liquor, dry caustic soda was added to an amount equal to 1¼% by weight of the clay. The caustic soda used was 98% pure. No material change in the viscosity of the clay slip occurred, and its color deteriorated slightly. Then, on adding a further 1¼% by weight of the caustic soda, the clay slip thickened up, and a great improvement occurred in its color. At this stage zinc sulphite was deposited from the solution. On adding further amounts of caustic soda up to a further 2½% by weight of the clay, no further change in the clay slip took place. Then, on adding an excess of caustic soda thereafter, the clay slip became thinner and its color receded. This action probably corresponded to the formation of soluble soda zincate. The thickening of the clay slip was more pronounced when the water used was hard, as is the case with London tap water.

Example No. 2

This was the same as Example No. 1, except that caustic soda was replaced by sodium bicarbonate. Of this alkali, it required from 8 to 10% by weight of the clay before the clay slip thickened and the color improved as in Example No. 1.

Example No. 3

This was like Example No. 1, except that after adding the caustic soda to an amount where the clay slip thickened; there was added at this stage up to 2½% by weight relative to the clay used, of the hydrosulphurous compound used for bleaching the clay. The clay slip still retained its thickened consistency in this case, and its color was still further improved. Then, on adding an excess of the hydrosulphurous acid compound, the clay slip became thinner.

This last example showed that the clay could be improved in color by successive alternate treatments of hydrosulphurous acid compound and excess alkali up to the thickening point; eliminating alkalinity if desired. It thus appears that the reagents should be of a quantity or a concentration sufficient to displace the metallic radical of the hydrosulphurous acid compound in insoluble form.

On further experimentation, I have found that this thickening and improving color of the clay slip were caused by several different reagents, including caustic potash, $K_2CO_3$, trisodium phosphate and borax as well as a combination of barium chloride or zinc chloride or calcium chloride and caustic soda; all when using the above-mentioned bleaching agent.

The interaction between such salts as potassium carbonate and magnesium sulphate can also be made use of to produce insoluble substances in the clay slip during or after bleaching to neutralize the alkalinity of the clay slip. For example, if potassium carbonate is substituted for caustic soda in Example No. 1, and magnesium sulphate, for example, be then added to neutralize the excess of potassium carbonate, the alkalinity of the clay is neutralized and further insoluble substances formed in the clay slip.

My preferred treatment is to deflocculate the clay by any well-known methods to remove or reduce impurities, and thereafter treat it as above described. Different clays, of course, require some variation in the treatment. Where sodium hydrosulphite is used as a bleaching agent, there could be no deposition of insoluble sodium compounds in the clay slip, since all sodium salts are soluble. When using this bleaching reagent, I found that if zinc chloride was added after bleaching, and then sufficient caustic soda was added, thickening of the clay occurred and further improvement in color took place. When the zinc chloride was replaced by calcium chloride, color, etc. were also improved. Thickening of the clay slip will vary in degree with different clays, as will also the amount of color improvement.

Clay treated as above described and containing precipitated zinc oxide, for example, will present advantages in processes for filling, sizing and finishing textiles where clay and zinc oxide are used. Many other uses will be obvious to those skilled in this clay art.

From the above description, it will be apparent that I bleach or whiten the clay slip in aqueous suspension with a water-soluble bleaching-metal-salt of hydrosulphurous acid, for example, sodium hydrosulphite, zinc hydrosulphite, etc. This metal is of a type that is replaceable by an alkaline metal and which is preferably of a type to provide a substantially insoluble metal compound with such alkaline metal. An alkaline metal compound preferably of a type suitable for forming a substantially insoluble compound with the metal of the bleaching metal salt is added in quantity sufficient to neutralize the acidity of the slip, thus bringing the slip to a pH value of approximately 7. Additional compound of such alkaline metal is added in quantity beyond neutralization of the acid slip, up to a point that may be termed a thickening point, which in Example 1, is obtained at a pH of about 10 for the Georgia clay used. At this thickness point, the thickness as well as the color brightness or whiteness of the slip are very materially and markedly improved. When I speak of color brightness, I have particular reference to a whitening type of color improvement that is advantageous where the slip is to be employed in the manufacture of paper and in the filling, sizing, and finishing of textiles, etc.

Changes may be made in the process, and various steps thereof without departing from my invention.

The claims herein which call for adding reagent to produce neutrality and adding further or additional reagent beyond complete neutrality to alkalize the slip, are to be construed to cover the total addition of reagent required to achieve the results of the invention in one or more steps; and in one or more batches or increments either in a single step or in a plurality of steps.

I claim:

1. In a process for improving the quality of earthy minerals such as a clay slip, the steps of treating the clay in aqueous suspension with a water-soluble bleaching-metal-salt of hydrosulphurous acid, said metal being replaceable to produce precipitated solids, then adding an alkaline reagent in quantity sufficient to completely neutralize acidity of the clay slip, and improving the color of and thickening the said neutral slip by adding additional alkaline reagent to deposit additional solids at a pH value materially above neutrality and up to a point of excessive alkalinity, at which latter point additional solids will redissolve and color will recede.

2. In a process as defined in claim 1, the preliminary step of deflocculating the clay before the further defined treatment thereof.

3. In a process as defined in claim 1, wherein the alkaline reagent includes a compound provided by interaction between potassium carbonate and magnesium sulphate.

4. In a process for improving the quality of earthy minerals such as a clay slip, the steps of bleaching the slip in aqueous suspension with a water-soluble bleaching-metal-salt of hydrosulphurous acid, said metal being replaceable by an alkaline metal, adding a compound of an alkaline metal in quantity sufficient to completely neutralize acidity of the clay slip, and improving the color of and thickening the said neutral slip by adding additional compound of the alkaline metal to deposit additional solids at a pH value materially above neutrality and up to a point of excessive alkalinity, at which latter point additional solids will redissolve and color will recede.

5. In a process as defined in claim 4 wherein caustic soda is employed as the compound of the alkaline metal added.

6. The process set forth in claim 4 in which the water-soluble bleaching-metal-salt of hydrosulphurous acid is zinc hydrosulphite.

7. The process set forth in claim 4 in which the clay slip has a pH value of approximately 7 when it is completely neutral, and a pH value materially over 7 and up to approximately 10 when its color is improved and thickening is increased.

8. In a process for improving the quality of earthy minerals such as a clay slip, the steps of bleaching the slip in aqueous suspension with a water-soluble bleaching-metal-salt of hydrosulphurous acid, said metal being replaceable by an alkaline metal to provide a substantially insoluble metal compound, adding a compound of an alkaline metal capable of forming such an insoluble compound and in quantity sufficient to completely neutralize acidity of the clay slip, and improving the color of and thickening the said neutral slip by adding additional compound of the alkaline metal to deposit additional solids at a pH value materially above neutrality and up to a point of excessive alkalinity, at which latter point additional solids will redissolve and color will recede.

9. In a process for improving the quality of earthy materials such as a clay slip, the steps of treating the slip in aqueous suspension with sodium hydrosulphite, adding zinc chloride, and adding a caustic alkali compound in quantity sufficient to completely neutralize acidity of the clay slip, and improving the color of and thickening the said neutral slip by adding additional alkali compound to deposit additional solids at a pH value materially above neutrality and up to a point of excessive alkalinity, at which latter point additional solids will redissolve and color will recede.

10. In a process for improving the quality of earthy minerals such as a clay slip, the steps of treating the clay slip in aqueous suspension with a water-soluble bleaching-metal-salt of hydrosulphurous acid and then adding one of the reagents of the class consisting of caustic alkali, alkali carbonate, trialkali phosphate, and borax, in quantity sufficient to completely neutralize acidity of the clay slip, improving the color of and thickening the said neutral slip by adding additional quantity of the reagent to deposit additional solids at a pH value materially above neutrality and up to a point of excessive alkalinity, at which latter point additional solids will redissolve and color will recede.

11. In a process as defined in claim 1, wherein the color of the clay slip is then further improved by adding an additional amount of said water-soluble bleaching-metal-salt and causing additional solids to precipitate therefrom by alkaline reagent.

12. In a process as defined in claim 1, wherein the alkaline reagent comprises a mixture of caustic soda and a metal chloride.

WILLIAM FELDENHEIMER.